United States Patent
Jiang et al.

(10) Patent No.: US 8,000,059 B2
(45) Date of Patent: Aug. 16, 2011

(54) PERPENDICULAR MAGNETIC WRITE HEAD WITH A THIN WRAP AROUND MAGNETIC SHIELD

(75) Inventors: Ming Jiang, San Jose, CA (US); Changqing Shi, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 843 days.

(21) Appl. No.: 11/955,305

(22) Filed: Dec. 12, 2007

(65) Prior Publication Data

US 2009/0154026 A1 Jun. 18, 2009

(51) Int. Cl.
*G11B 5/11* (2006.01)
*G11B 5/23* (2006.01)

(52) U.S. Cl. ......................................... 360/125.3
(58) Field of Classification Search ................ 360/125.3
See application file for complete search history.

(56) References Cited

U.S. PATENT DOCUMENTS

| | | | | |
|---|---|---|---|---|
| 4,935,832 | A * | 6/1990 | Das et al. | 360/112 |
| 7,002,775 | B2 * | 2/2006 | Hsu et al. | 360/125.03 |
| 7,019,943 | B2 | 3/2006 | Sato | 360/126 |
| 7,031,121 | B2 | 4/2006 | Khera et al. | 360/317 |
| 7,070,698 | B2 | 7/2006 | Le | 216/22 |
| 7,140,095 | B2 * | 11/2006 | Matono | 29/603.15 |
| 7,239,478 | B1 * | 7/2007 | Sin et al. | 360/125.3 |
| 7,551,396 | B2 * | 6/2009 | Hsu et al. | 360/125.3 |
| 2004/0212923 | A1 | 10/2004 | Taguchi | 360/125 |
| 2005/0024771 | A1 | 2/2005 | Le | 360/126 |
| 2005/0083605 | A1 * | 4/2005 | Hu et al. | 360/125 |
| 2005/0105214 | A1 | 5/2005 | Im et al. | 360/125 |
| 2005/0141137 | A1 | 6/2005 | Okada et al. | 360/122 |
| 2006/0245109 | A1 * | 11/2006 | Hsu et al. | 360/126 |
| 2007/0019327 | A1 | 1/2007 | Maruyama et al. | 360/126 |
| 2007/0030602 | A1 | 2/2007 | Matono | 360/317 |
| 2007/0035885 | A1 | 2/2007 | Im et al. | 360/317 |
| 2007/0115584 | A1 | 5/2007 | Balamane et al. | 360/126 |
| 2007/0211377 | A1 * | 9/2007 | Sasaki et al. | 360/126 |
| 2008/0144215 | A1 * | 6/2008 | Hsiao et al. | 360/119.04 |
| 2010/0157472 | A1 * | 6/2010 | Hsiao et al. | 360/123.12 |

FOREIGN PATENT DOCUMENTS

JP 2004348928 12/2004

* cited by examiner

*Primary Examiner* — Julie Anne Watko
(74) *Attorney, Agent, or Firm* — Zilka-Kotab, PC

(57) ABSTRACT

A magnetic write head for perpendicular magnetic recording having a thin wrap-around magnetic shield. The small thickness and forming method of the thin wrap-around magnetic shield allow it to be electroplated using a thin photoresist frame mask. The thin photoresist frame mask has better critical dimension and straight wall control than a thicker mask, which allows the wrap-around magnetic shield to be constructed with much more straight and uniform back edge for shield throat height control than is possible when forming a thicker (i.e. taller) shield. The thin wrap-around magnetic shield can be stitched to a trailing return pole to avoid magnetic saturation of the wrap-around shield.

4 Claims, 15 Drawing Sheets

PERPENDICULAR MAGNETIC WRITE HEAD WITH A THIN WRAP AROUND MAGNETIC SHIELD

FIELD OF THE INVENTION

The present invention relates to perpendicular magnetic recording and more particularly to a magnetic write head having a thin wrap-around shield for improved wrap-around shield throat height control.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed, for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

Although such perpendicular magnetic recording heads have the potential to increase data density over longitudinal recording system, the ever increasing demand for increased data rate and data density requires even further improvement in write head design. For example it is desirable to have a wrap-around shield surrounding the write pole including a trailing shield (TS) separated from the write pole by a non-magnetic top gap layer and a pair of side shields separated from the write pole by a nonmagnetic side gap layer. The trailing shield improves the down track write tiled gradient for better writing and data error rate performance. The side shields control the write width and eliminate adjacent track erasure. The dimension of wrap-around shield back edge to ABS called the shield throat height is critical and must be very well controlled for writing performances.

SUMMARY OF THE INVENTION

The present invention provides a magnetic write head having a thin wrap-around magnetic shield. The write head includes a write pole formed on a substrate and having a non-magnetic trailing gap layer formed at a trailing edge of the write pole and having first and second non-magnetic side gap layers formed at either side of the write pole. A thin wrap around magnetic shield is formed conformally over the write pole and trailing and side gap layers. The thin wrap-around shield has a thickness of 0.5 um from electroplating through 1.5 um height of photoresist frame, compared with prior art wrap-around shield of final 1.0 um height of trailing shied and 2.0 um height of side shields from CMP after 3.0 um height of electroplating through 4.0 um height of photoresist frame.

The small thickness and forming method of the thin wrap-around trailing shield allows the trailing and side shields to advantageously be constructed using a thin electroplating photoresist frame. Such a thin electroplating photoresist frame is much less prone to having edge deformities that could lead to back edge non-uniformity of the wrap around shield. Therefore, the small thickness of the wrap-around shield and small thickness of the photoresist frame electroplating mask, allows the wrap around magnetic shield to be constructed with a very uniform straight back edge. This resulting back edge uniformity avoids some shield portion lap-though and shield throat height control problems that have been experienced with prior art wrap-around shields.

In order to avoid magnetic saturation of the thin wrap around shield, a trailing magnetic return pole can be stitched to the wrap around shield. Connection of the trailing magnetic return pole with the wrap around shield can be in a region removed from the write pole (such as at either side of the write pole) or can also be made at a location above the write pole (near the trailing edge of the write pole)

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
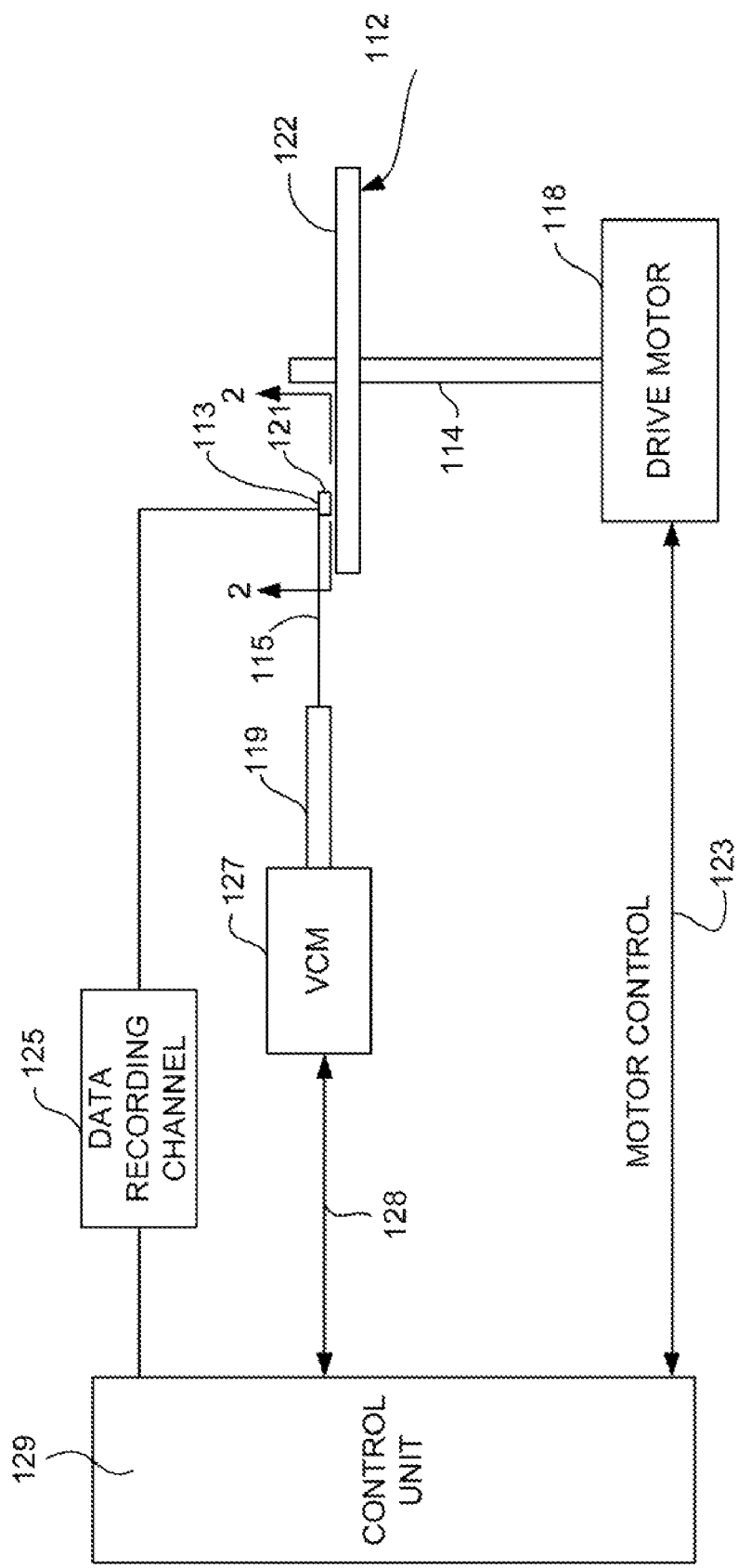
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on die slider. The air bearing thus counter-balances die slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
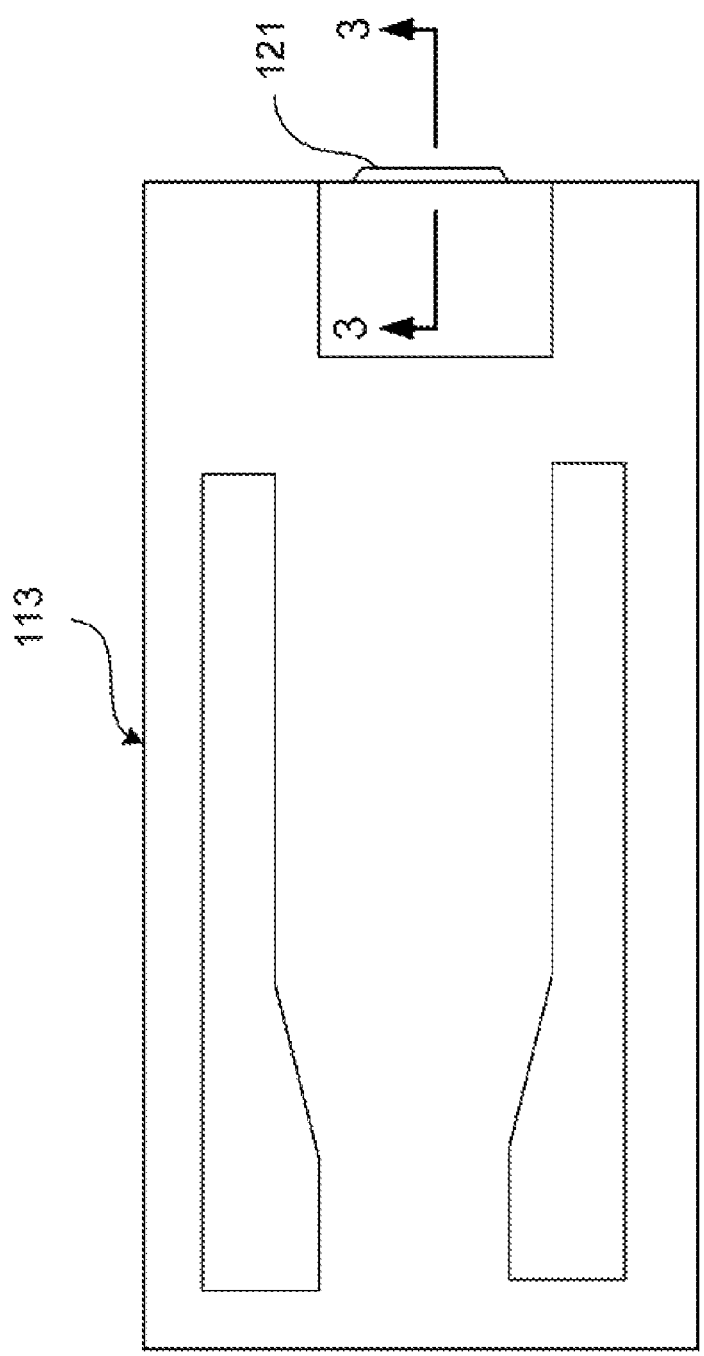
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
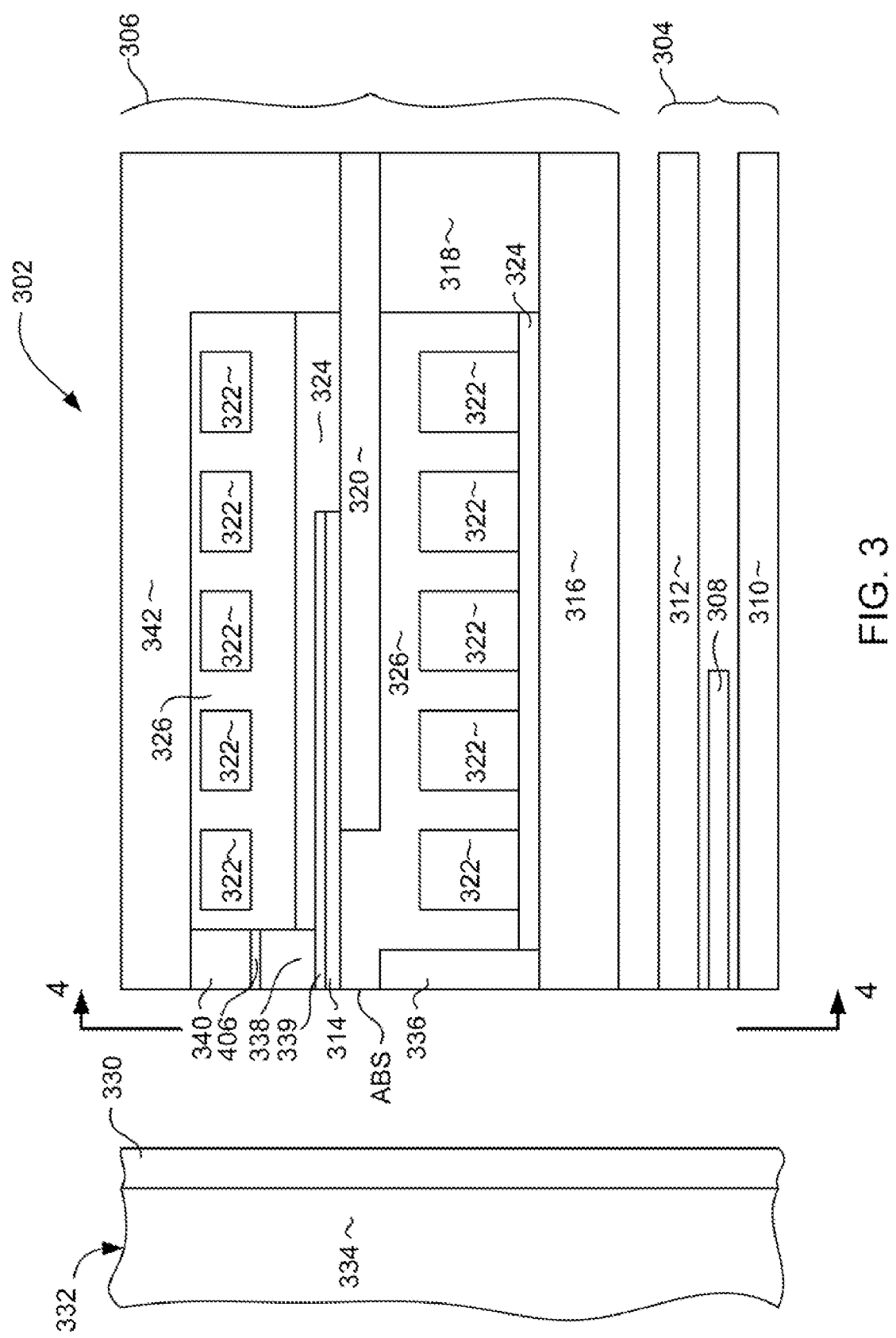
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322, a resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and week that if does not erase the data bit recorded by the write head 314.

In order to increase write field gradient and eliminate adjacent track erasure, a wrap-around magnetic shield 338 is provided. The wrap-around magnetic shield 338 is separated from the write pole by a non-magnetic write gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole. This canting of the write field increases the speed with which write field polarity can be switched on the magnetic medium by increasing the field gradient. The return pole 340 can be stitched to a magnetic trailing return pole connector 342 that can magnetically connect the trailing return pole 340 with the back portion of the write head 302.

Figure 4:
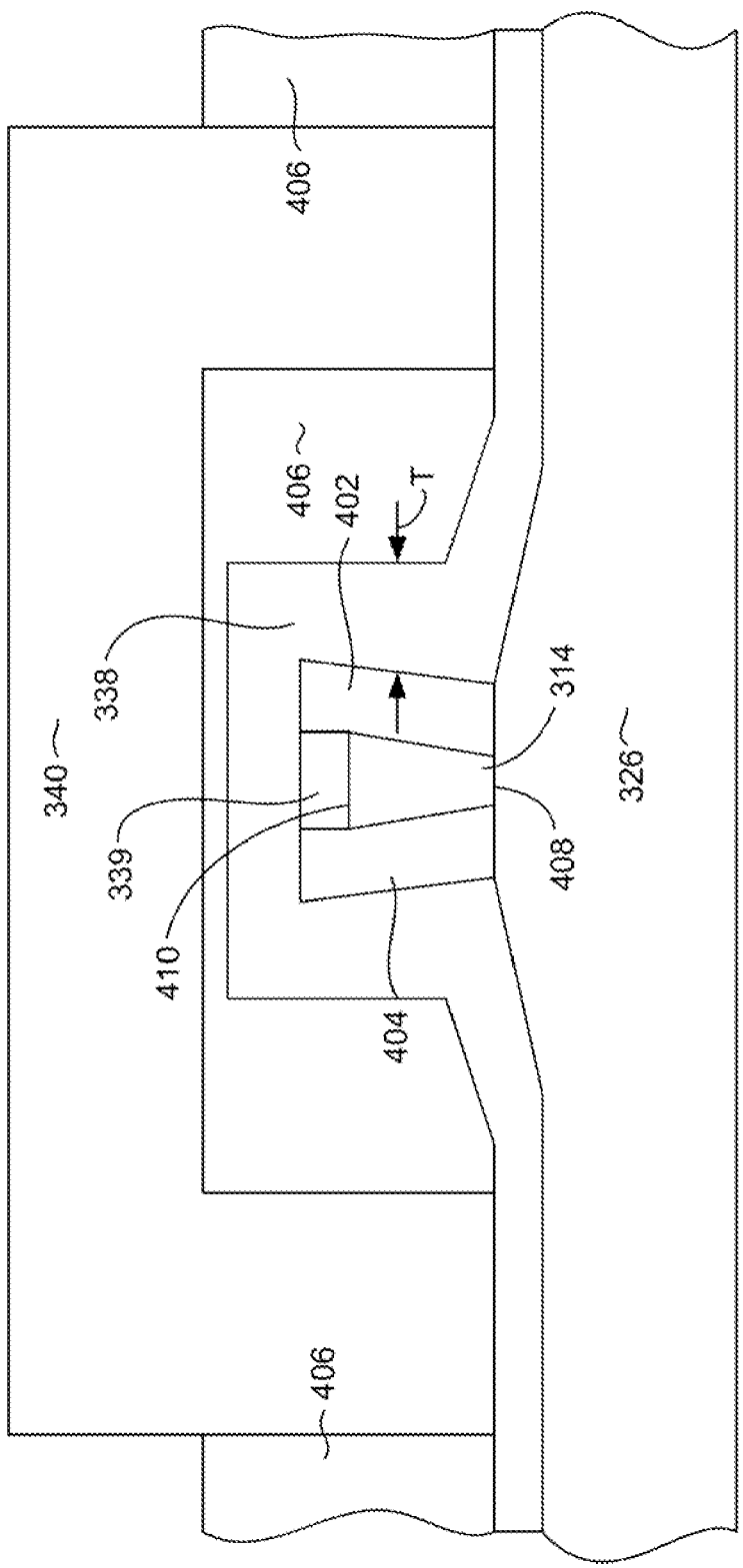
FIG. 4 is an ABS view of a portion of the write head of FIG. 3.

With reference to FIG. 4, the connection of the wrap-around shield 338 with the trailing return pole 340 can be more clearly understood. FIG. 4 shows an enlarged view of the write pole 314 as viewed from the air bearing surface. As can be seen, the wrap-around shield 338 conforms to the write pole 314, and is formed very thin as compared with prior art wrap-around shields. The write pole has a leading edge 408 and a trailing edge 410 the distance between which defines a write pole height. The thin wrap-around magnetic shield 338 has a thickness T measured parallel with the air bearing surface (ABS) that is less than the write pole height, and which is preferably 0.2-0.8 um or about 0.5 um.

The wrap-around magnetic shield 338 is separated from the sides of the write pole by first and second non-magnetic side gap layers 402, 404 that can be constructed of alumina or some other material. The wrap-around shield 338 is also partially surrounded by a non-magnetic fill layer 406 that also can be alumina. The trailing return pole 340 is stitched to the thin wrap-around shield 338 in a region slightly removed front the write pole 314.

As can be seen, in the embodiment shown in FIG. 4, the fill layer 406 extends over the wrap-around shield in a region above the write pole 314, thereby separating the trailing return pole 340 from the trailing shield 338 in the region above the write pole 314. However, the write head could be constructed so that the trailing return pole 340 contacts the thin wrap-around shield 338 in this region above the write pole 314. Such a construction will be described below with regard to a method of manufacturing an alternate possible embodiment of the invention.

Figure 5:
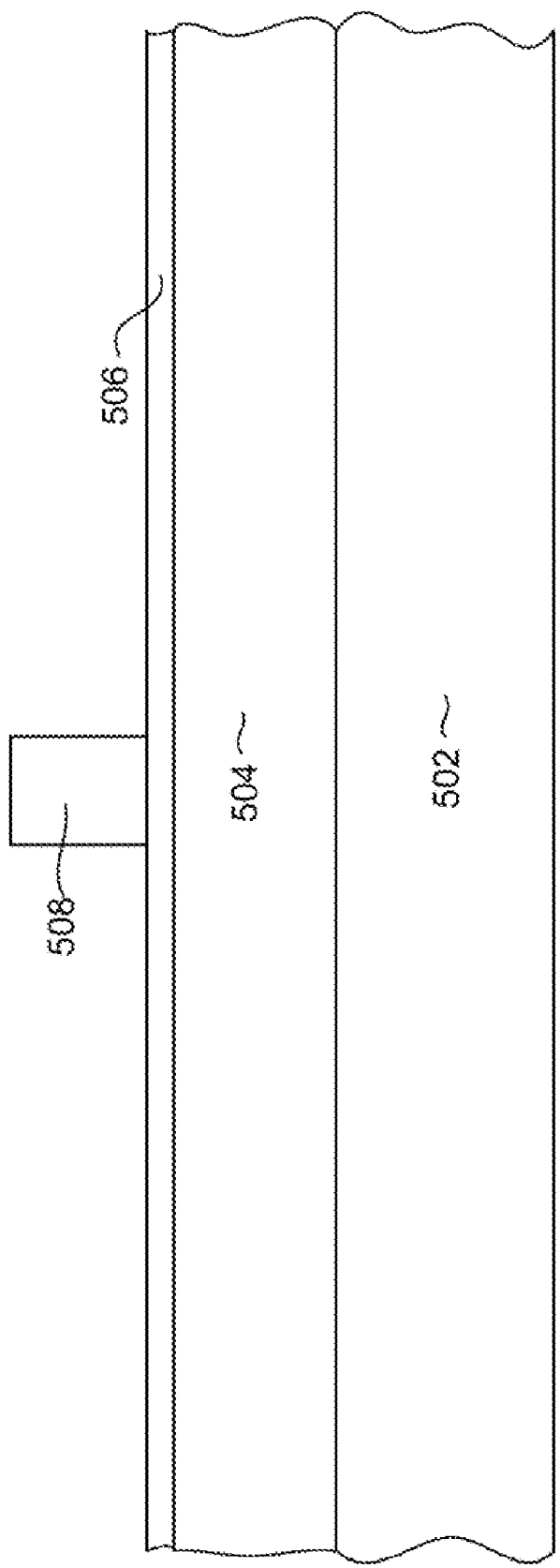
FIGS. 5-15 are views of a write head, in various intermediate stages of manufacture illustrating method for manufacturing a write head according to an embodiment of the invention.

FIGS. 5-12 illustrate a method for manufacturing a write head such as that described above. With particular reference to FIG. 5, a substrate 502 is provided. The substrate 502 can be the alumina fill layer 326 and may include a portion of the shaping layer described above with reference to FIG. 3. A magnetic write pole material 504 is deposited over the substrate. This magnetic write pole material 504 can be a lamination of magnetic layers separated by thin non-magnetic layers. A hard mask layer 506 such as a thin alumina layer is deposited over the magnet write pole material 504. A mask structure 508 is formed over the hard mask layer 506. The mask structure 508 includes a photoresist layer that has been patterned to define a write pole structure, and may include other layers such as a DURMIDE® image transfer layer, second hard mask layer, etc.

Figure 6:
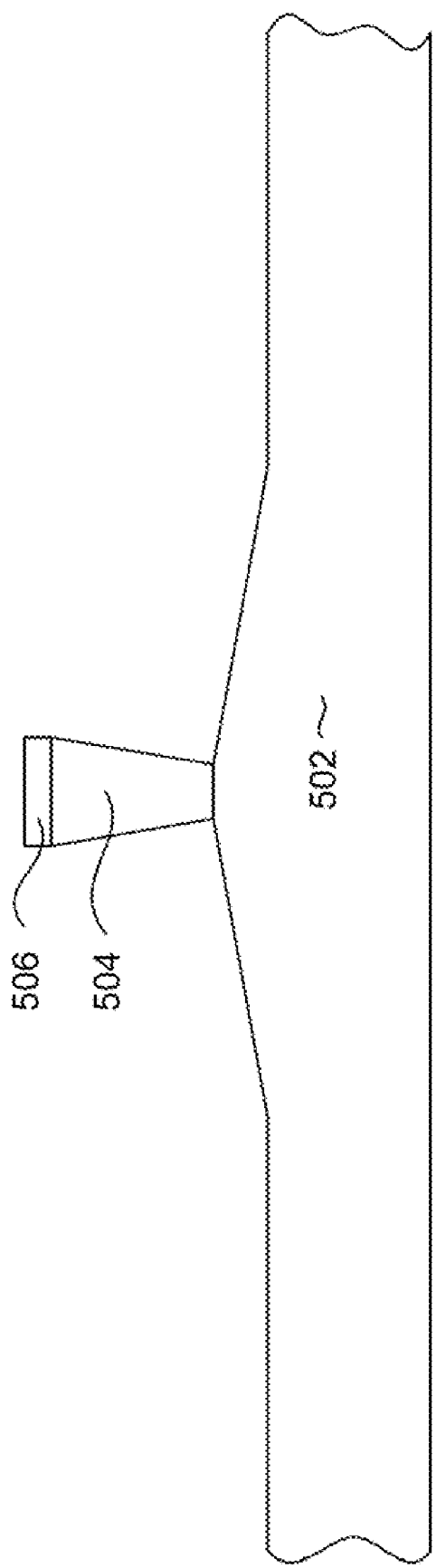

An ion milling is then performed to remove portions of the magnetic write pole material 504 that are not protected by the mask layer 508. This ion milling can be performed at one or more angles to construct a trapezoidal write pole 504 as shown in FIG. 6. The mask layer 508 (FIG. 5) may be consumed by the ion milling process. The remaining hard mask layer 506 can be left intact to provide a trailing gap layer, as will be seen.

Figure 7:
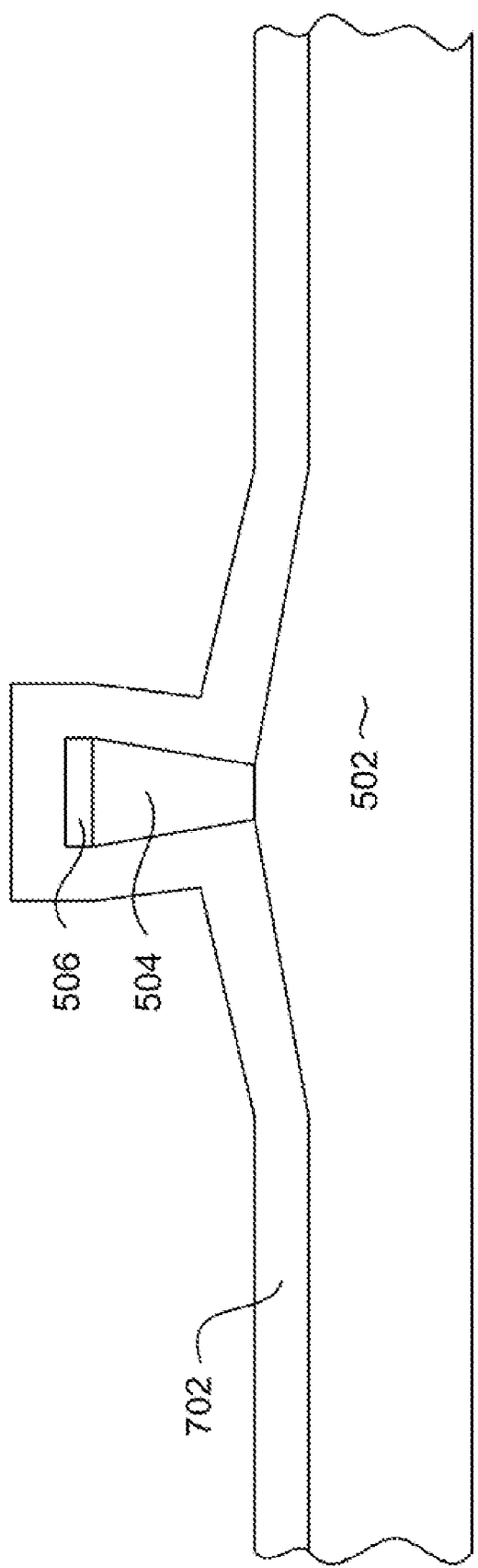
Figure 8:
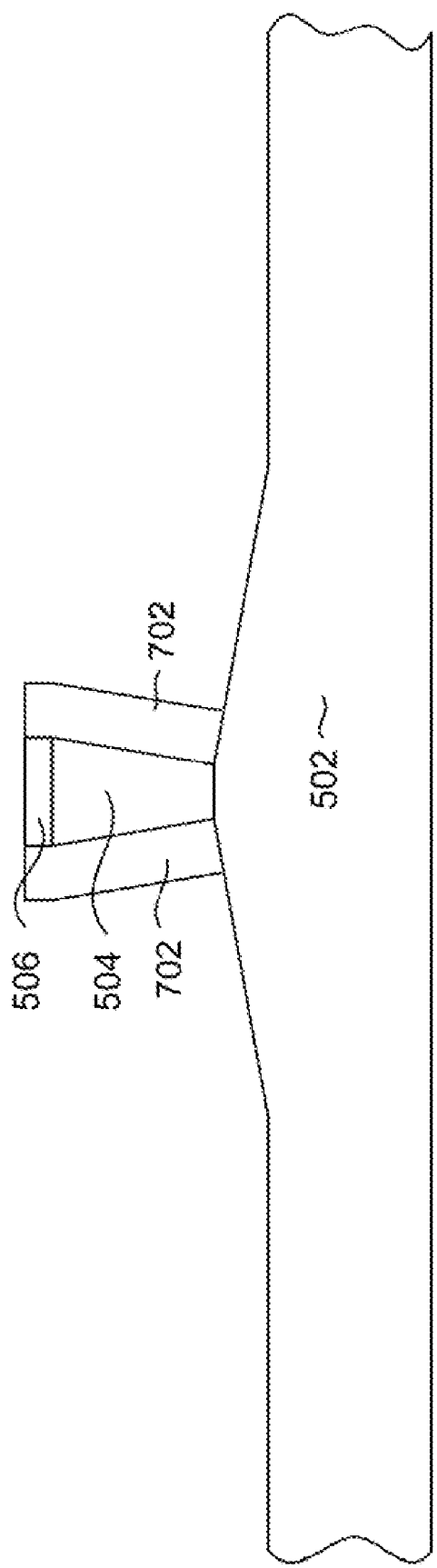

With reference now to FIG. 7, a non-magnetic side gap material (preferably alumina) 702 is deposited. The non-magnetic side gap material 702 is preferably deposited by a conformal deposition method such as atomic layer deposition (ALD) or chemical vapor deposition (CVD). A reactive ion milling (or some other suitable process) is then performed to preferentially remove horizontally disposed portions of the non-magnetic side gap layer, resulting in non-magnetic side walls 702 as shown in FIG. 8.

Figure 9:
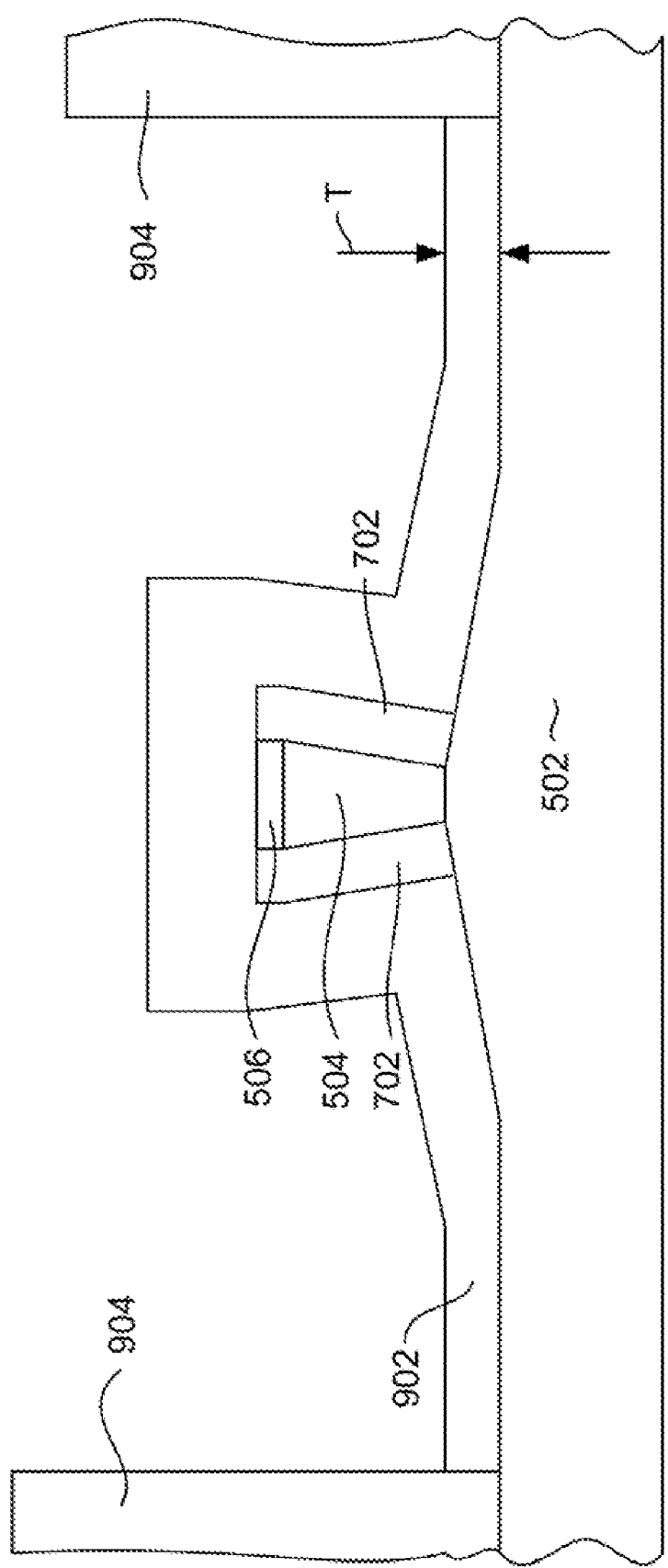

With reference now to FIG. 9, a photoresist frame 904 is constructed and a thin, conformal wrap-around magnetic shield 902 is electroplated around the write pole 314. The wrap-around trailing shield, is electroplated thin as compared with prior art trailing shield. Prior art wrap-around shields were plated to a thickness far greater than thin wrap-around shields. This however required the use of a very thick electroplating photoresist frame. However such thick masks suffer from poor side wall definition on topography, resulting in intolerable variations in the back edge of the wrap around shield. By making the wrap around shield 902 thin, the electroplating photoresist frame mask (not shown) used to define the shape of the wrap-around shield can be formed with excellent back wall conformity. To this end, the wrap-around magnetic shield 902 preferably has a thickness T of 0.2-0.8 um (or about 0.5 um), and can be electroplated through 1.5 um height of photoresist frame, as compared with prior art wrap-around shields that were greater than 1.0 um in trailing direction and with 2.0 um side shield portions before CMP, requiring a 3.0 um after electroplating through a 4.0 um height of photoresist frame.

Figure 10:
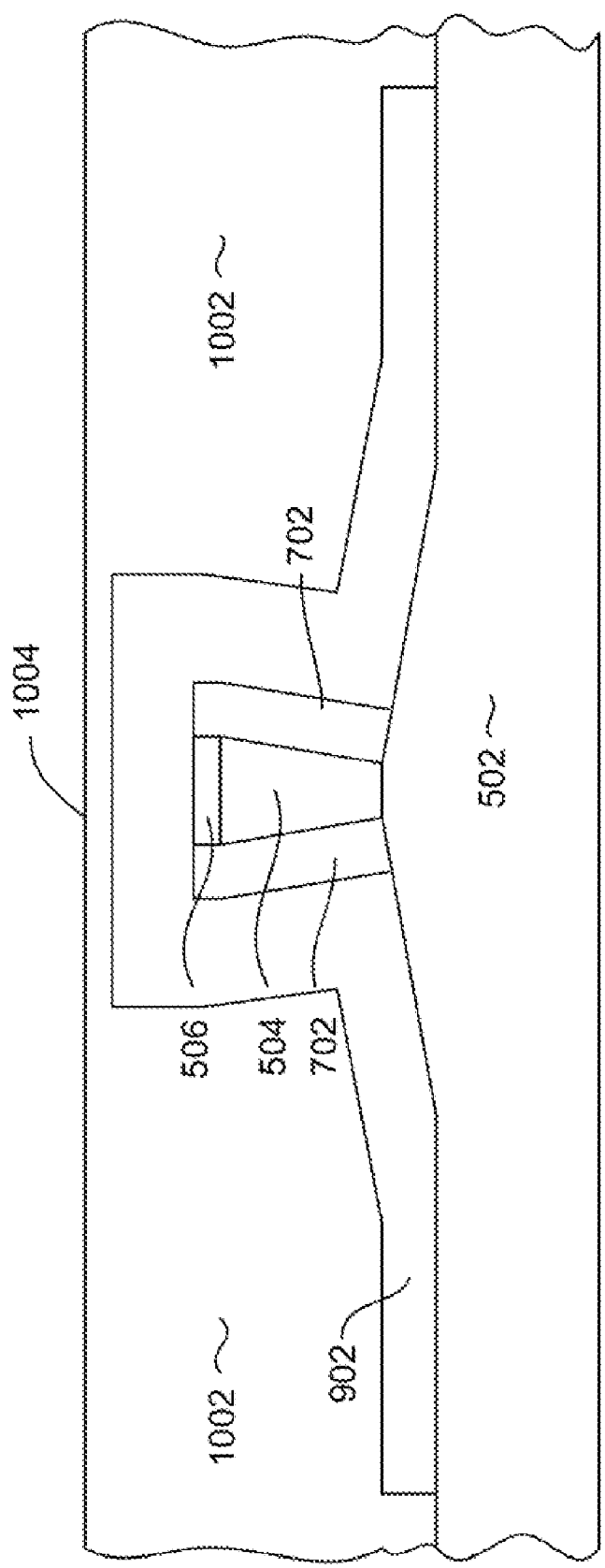

With reference now to FIG. 10, a fill layer 1002 is deposited. The fill layer 1002 is preferably alumina, but could be some other material. A chemical mechanical polishing process can be performed to form the fill layer 1002 with a planar surface 1004 as shown in FIG. 10.

Figure 11:
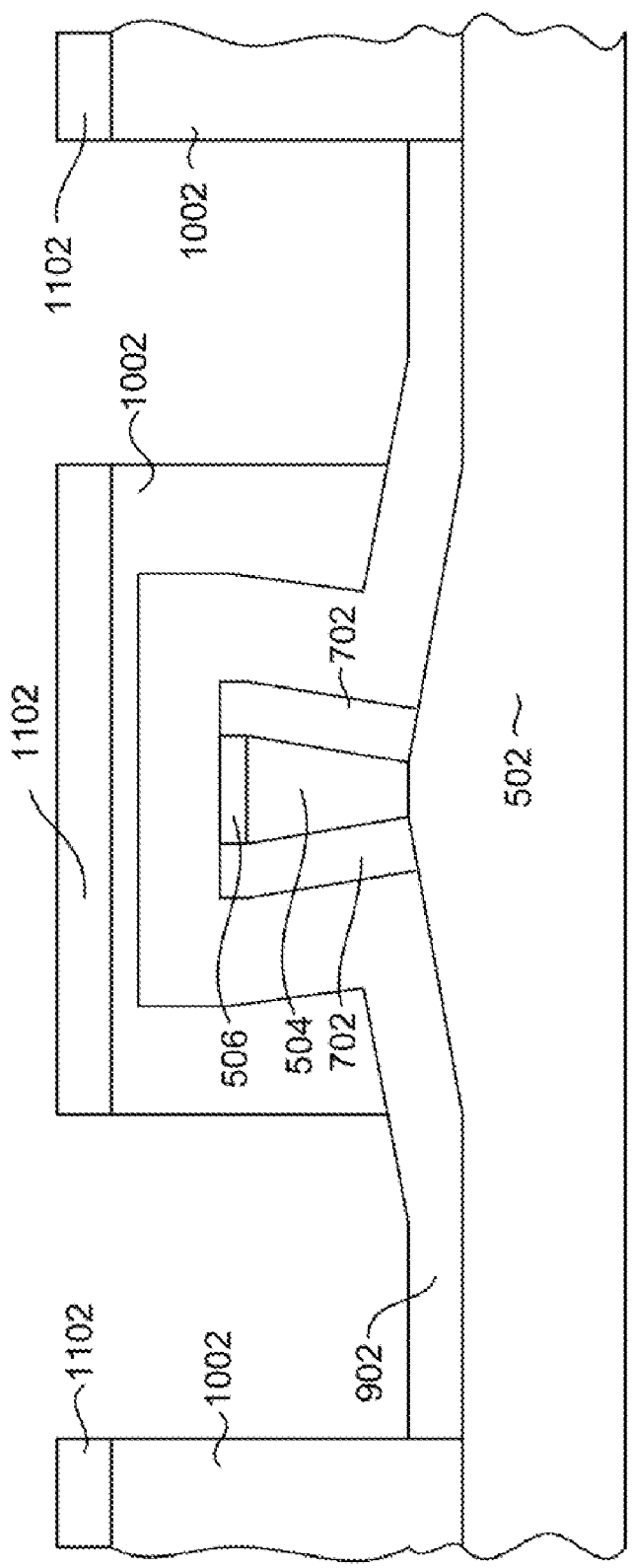

Then, with reference to FIG. 11, a mask structure 1102 is formed over the fill layer 1002. The mask structure 1102 has openings at areas at either side of the write pole 504. A material removal process such as reactive ion milling process (RIM) is then performed to remove material not protected by the mask structure 1102, thereby forming trenches in the fill layer 1002. The RIM is performed sufficiently to expose the underlying wrap-around magnetic shield 902. The mask layer 1102 is removed after trench formed.

Figure 12:
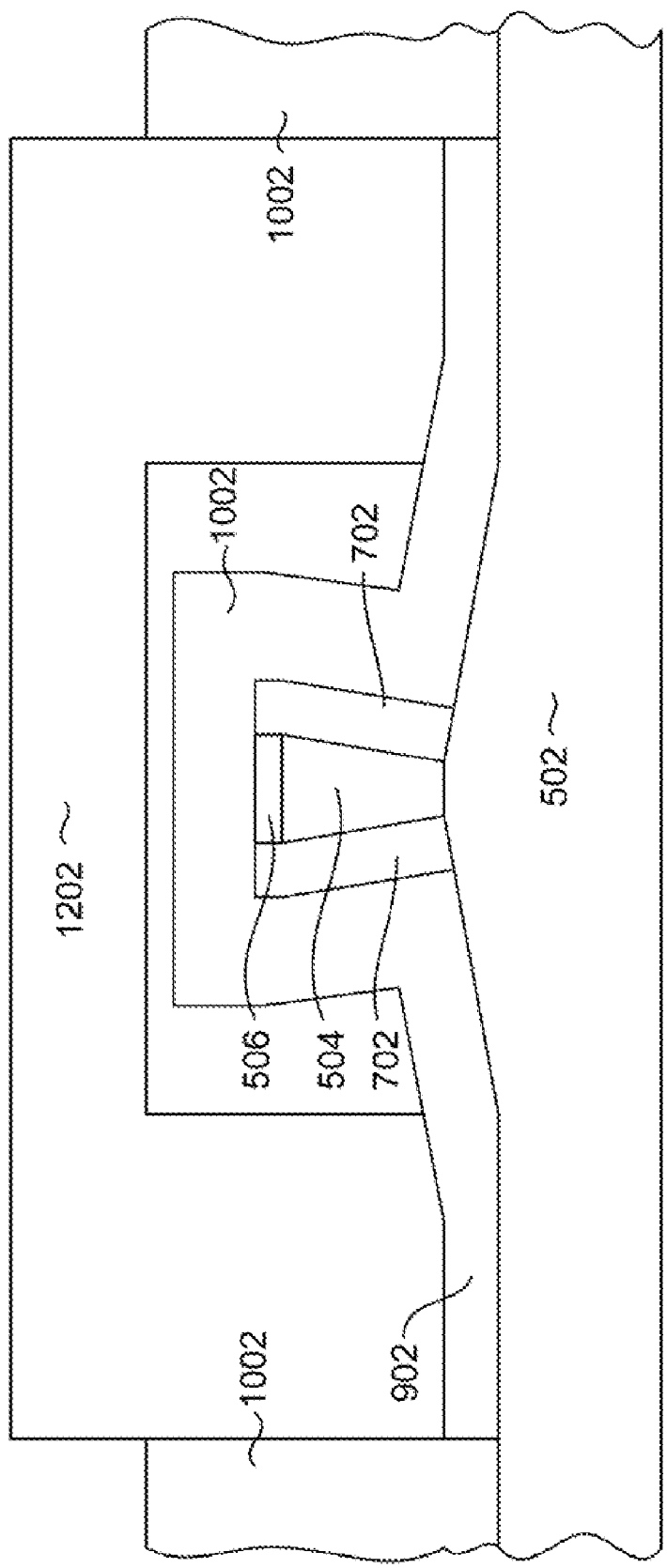

Then, with reference to FIG. 12, a magnetic trailing return pole is electroplated, so that it extends into the trenches formed in the fill layer 1002, so that the trailing magnetic return pole structure 1202 contacts the wrap-around shield 902 in these trenches.

Figure 13:
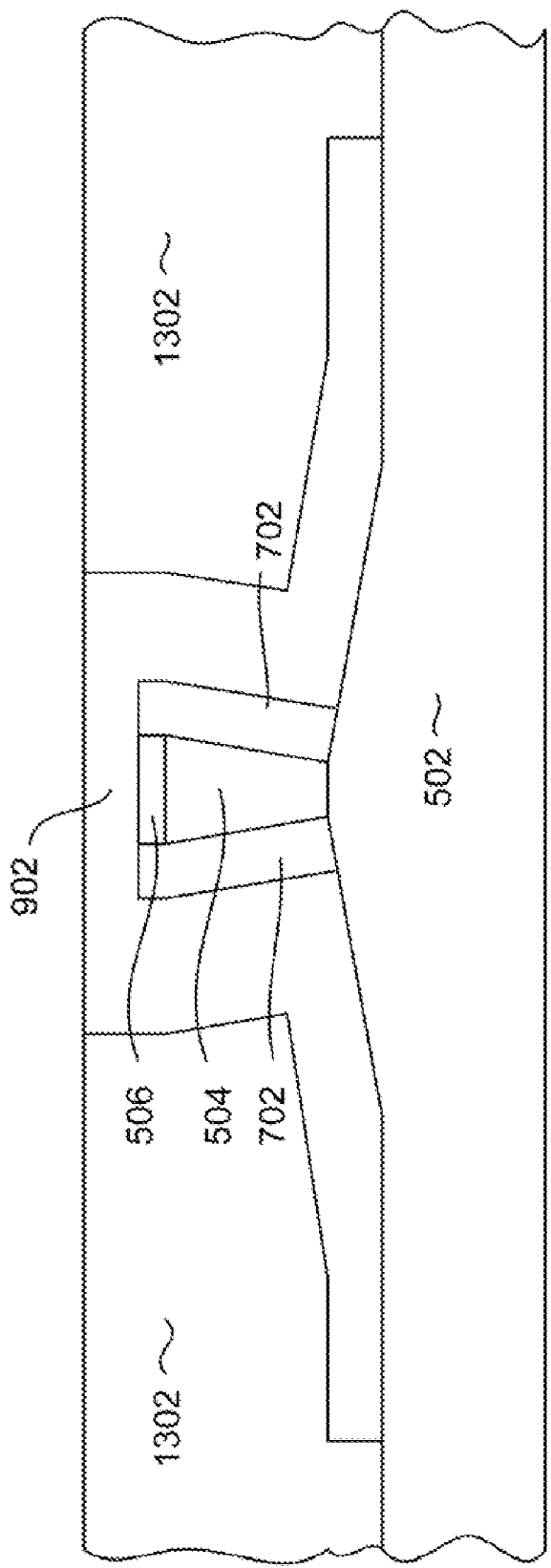
Figure 14:
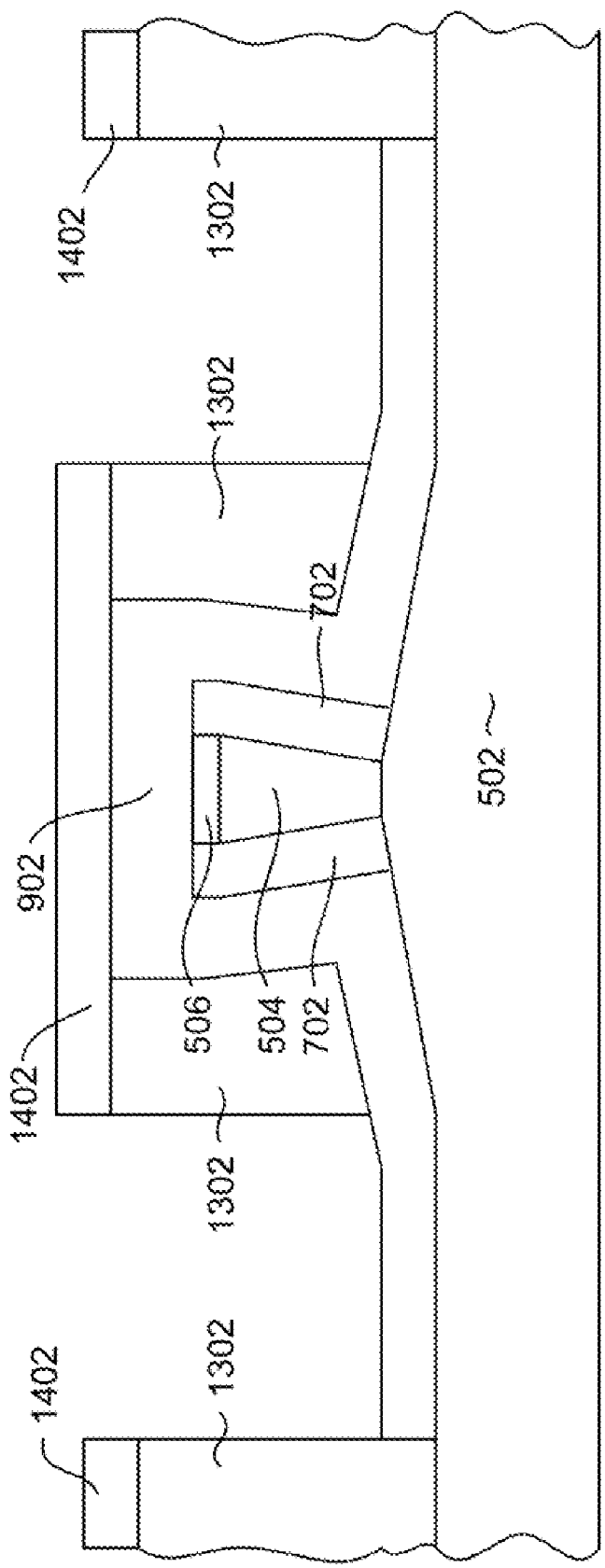
Figure 15:
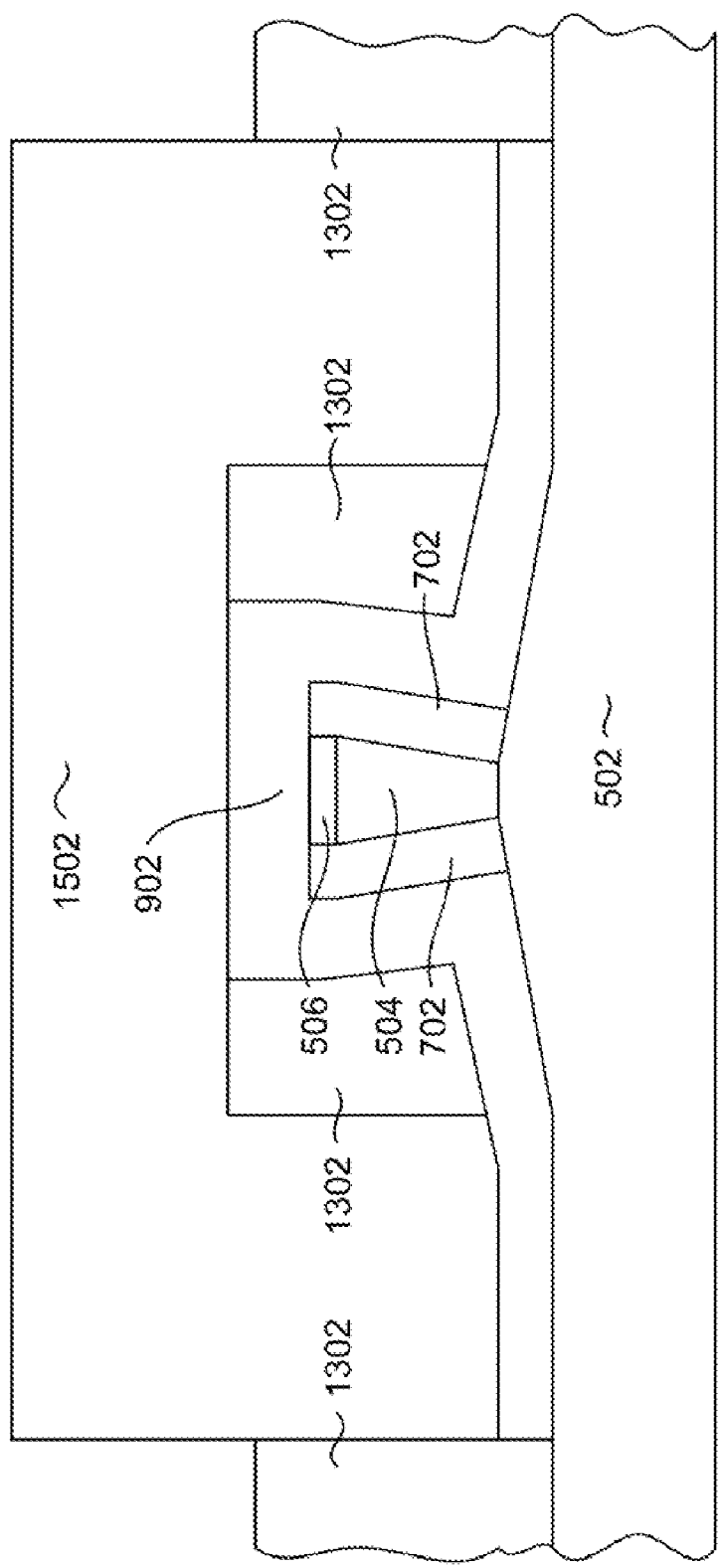

With reference to FIGS. 13-15, a method for manufacturing a write head according to an alternate embodiment of the invention is described. Starting with a structure as shown in FIG. 9 with the photoresist frame 904 lifted off, a fill layer 1302 such as alumina is deposited. A material removal process such as chemical mechanical polishing (CMP) is performed sufficiently to expose the wrap-around magnetic shield 902 in a region over the write pole 504. This results in a planar surface across the fill layer 1302, and wrap-around trailing magnetic shield 902. With reference to FIG. 14, a mask structure 1402 is formed having openings at either side of the write pole 504, and a material removal process such as reactive ion milling (RIM) is performed to remove portions of the fill layer that are not protected by the mask 1402. As with the above described embodiment, the RIM is performed sufficiently to expose the underlying wrap around shield 902 within the trench. The mask layer 1402 is removed after trench formed.

Then, with reference to FIG. 15, a trailing magnetic return pole structure 1502 is formed by electroplating. The trailing magnetic return pole structure 1502 is formed so that it extends into the openings in the fill layer 1302 to contact the wrap-around shield 902 within these openings. However, with this embodiment, as can be seen, the trailing return pole structure 1502 also contacts the wrap-around shield 902 the region above the write pole 504, where the wrap-around shield 902 is exposed through the fill layer 1302. This embodiment provides improved protection against magnetic saturation of the wrap-around shield 902. However, because chemical mechanical polishing is a difficult procedure to control with great accuracy, this method also presents greater manufacturing challenges over the previously described embodiment. Because the wrap around trailing shield 902 is so thin, if the chemical mechanical polishing process proceeds too far the portion of the wrap around shield 902 extending over the write pole could be removed completely. Therefore, careful control of the chemical mechanical polishing process must be exercised.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular magnetic data recording, comprising:
   a magnetic write pole, extending to an air bearing surface and having a trailing edge, a leading edge and first and first and second sides that each extend from the trailing edge to the leading edge the distance between the trailing edge and the lead edge defining a write pole height;
   a non-magnetic trailing gap layer formed at the trailing edge of the write pole;
   first and second non-magnetic side gap layers formed at the first and second sides of the write pole;
   a wrap-around trailing magnetic shield that wraps around the write pole, non-magnetic side gap layers and trailing gap layer, the wrap-around trailing shield having a thickness measured parallel with that air bearing surface that is less than the write pole height; and
   a trailing magnetic return pole that is magnetically connected with the wrap-around magnetic trailing shield in a region removed from the write pole.

2. A magnetic write head for perpendicular magnetic data recording, comprising:
   a magnetic write pole, extending to an air bearing surface and having a trailing edge, a leading edge and first and first and second sides that each extend from the trailing edge to the leading edge the distance between the trailing edge and the lead edge defining a write pole height;
   a non-magnetic trailing gap layer formed at the trailing edge of the write pole;
   first and second non-magnetic side gap layers formed at the first and second sides of the write pole;
   a wrap-around trailing magnetic shield that wraps around the write pole, non-magnetic side gap layers and trailing gap layer, the wrap-around trailing shield having a thickness measured parallel with that air bearing surface that is less than the write pole height; and
   a trailing magnetic return pole that is magnetically connected with the wrap-around magnetic trailing shield in a region removed from the write pole and is separated from the wrap-around magnetic shield by a fill layer in a region near the write pole.

3. A magnetic write head for perpendicular magnetic data recording, comprising:
   a magnetic write pole, extending to an air bearing surface and having a trailing edge, a leading edge and first and first and second sides that each extend from the trailing edge to the leading edge the distance between the trailing edge and the lead edge defining a write pole height;
   a non-magnetic trailing gap layer formed at the trailing edge of the write pole;
   first and second non-magnetic side gap layers formed at the first and second sides of the write pole;
a wrap-around trailing magnetic shield that wraps around the write pole, non-magnetic side gap layers and trailing gap layer, the wrap-around trailing shield having a thickness measured parallel with that air bearing surface that is less than the write pole height; and
   a fill layer formed around the write pole covering a portion of the wrap-around magnetic shield, the fill layer having an opening that extends to the wrap around magnetic shield in a region removed from the write pole; and
   a magnetic trailing return pole formed over the fill layer and extending into the opening in the fill layer to contact the wrap-around trailing magnetic shield.

4. A magnetic write head for perpendicular magnetic data recording, comprising:
   a magnetic write pole, extending to an air bearing surface and having a trailing edge, a leading edge and first and first and second sides that each extend from the trailing edge to the leading edge the distance between the trailing edge and the lead edge defining a write pole height;
   a non-magnetic trailing gap layer formed at the trailing edge of the write pole;
   first and second non-magnetic side gap layers formed at the first and second sides of the write pole; and
   a wrap-around trailing magnetic shield that wraps around the write pole, non-magnetic side gap layers and trailing gap layer, the wrap-around trailing shield having a thickness measured parallel with that air bearing surface that is less than the write pole height; and
   wherein the wrap-around trailing shield has a surface located over the write pole, the write head further comprising:
   a fill layer having a surface that is coplanar with the surface of the wrap-around trailing shield over the write pole, and having an opening removed from the write pole that extends to the wrap around trailing shield;
   a trailing magnetic return pole formed over the fill layer, and contacting the surface of the wrap-around magnetic shield in the region over the write pole, the trailing magnetic return pole also extending into the opening in the fill layer to contact the wrap-around trailing shield within the opening.

* * * * *

UNITED STATES PATENT AND TRADEMARK OFFICE
CERTIFICATE OF CORRECTION

PATENT NO. : 8,000,059 B2
APPLICATION NO. : 11/955305
DATED : August 16, 2011
INVENTOR(S) : Ming Jiang et al.

It is certified that error appears in the above-identified patent and that said Letters Patent is hereby corrected as shown below:

In the Specification:

Column 2, line 39 replace "write tiled gradient" with --write field gradient--;

Column 4, line 7 replace "lift on die slider" with --lift on the slider--;

Column 4, line 8 replace "die slight spring" with --the slight spring--;

Column 5, line 2 replace "that if does not" with --that it does not--;

Column 5, line 37 replace "front the write pole" with --from the write pole--.

Signed and Sealed this
Fourteenth Day of July, 2015

Michelle K. Lee
*Director of the United States Patent and Trademark Office*